US009086098B2

(12) United States Patent
Kalman et al.

(10) Patent No.: US 9,086,098 B2
(45) Date of Patent: Jul. 21, 2015

(54) ANTI-TWIST JOINT, ORIENTING SYSTEM AND METHOD

(71) Applicant: The Board of Trustees of the Leland Stanford Junior University, Palo Alto, CA (US)

(72) Inventors: Andrew E. Kalman, San Francisco, CA (US); Eli David Bashevkin, Bennington, VT (US); Joseph Patrick Kenahan, Riverside, IL (US); Brian T. Mahlstedt, Redwood City, CA (US); Brian Thomas Manning, Marquette, MI (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 256 days.

(21) Appl. No.: 13/767,840

(22) Filed: Feb. 14, 2013

(65) Prior Publication Data

US 2013/0206957 A1    Aug. 15, 2013

Related U.S. Application Data

(60) Provisional application No. 61/598,857, filed on Feb. 14, 2012.

(51) Int. Cl.
| F16D 1/12 | (2006.01) |
| F16D 3/18 | (2006.01) |
| F16M 11/10 | (2006.01) |
| F16M 11/18 | (2006.01) |
| F16M 11/20 | (2006.01) |

(52) U.S. Cl.
CPC ............... *F16D 3/18* (2013.01); *F16M 11/105* (2013.01); *F16M 11/18* (2013.01); *F16M 11/2064* (2013.01)

(58) Field of Classification Search
CPC ....... F16M 11/02; F16M 11/04; F16M 11/12; F16M 11/18; F16M 11/105; F16M 11/121; F16M 11/125; F16M 11/2064; F16D 3/18; F16L 43/02
USPC .................. 403/53, 57, 58; 244/173.1, 173.3; 248/237, 292.1, 346, 346.06, 371, 395, 248/422, 652, 664, 668
See application file for complete search history.

(56) References Cited

U.S. PATENT DOCUMENTS

| 4,384,692 | A | * | 5/1983 | Preukschat | ................. 244/158.1 |
| 4,491,446 | A | * | 1/1985 | Ewald | ............................. 410/32 |
| 5,237,764 | A | * | 8/1993 | Gray | ................................ 40/473 |

(Continued)

*Primary Examiner* — Gregory Binda
*Assistant Examiner* — Nahid Amiri
(74) *Attorney, Agent, or Firm* — Shay Glenn LLP (57) ABSTRACT

A positioning system is provided for orienting a payload. The system may continuously orient the payload relative to another object without twisting connections of the payload. The positioning system may be provided with a base, a rotating member, a pivoting member, an anti-twist member, and a coupling apparatus. The rotating member may be rotatably mounted to the base such that the rotating member rotates about a first axis. The pivoting member may be pivotably mounted to the rotating member such that the pivoting member pivots about a second axis. The anti-twist member may be rotatably mounted to the pivoting member. The coupling apparatus may rotationally couple the anti-twist member to the base such that the rotational orientation of the anti-twist member relative to the base remains constant regardless of a rotational orientation or a pivoting orientation of the pivoting member relative to the base.

13 Claims, 8 Drawing Sheets

(56) References Cited

U.S. PATENT DOCUMENTS

| | | | |
|---|---|---|---|
| 6,276,649 B1 * | 8/2001 | Kruse | 248/346.01 |
| 6,592,085 B2 * | 7/2003 | Iwata et al. | 248/118.1 |
| 6,734,830 B1 * | 5/2004 | Bickham | 343/880 |
| 7,456,802 B1 * | 11/2008 | Bourgeois | 343/878 |
| 7,880,682 B2 * | 2/2011 | Fruh et al. | 343/757 |
| 8,281,524 B2 * | 10/2012 | Hund et al. | 52/173.3 |
| 8,505,853 B2 * | 8/2013 | Lagadec et al. | 244/171 |
| 8,616,502 B1 * | 12/2013 | Stribling et al. | 244/172.7 |
| 8,720,830 B1 * | 5/2014 | Szatkowski | 244/172.7 |
| 2011/0266297 A1 * | 11/2011 | Thorpe et al. | 220/831 |
| 2012/0228436 A1 * | 9/2012 | Francis | 244/173.3 |

\* cited by examiner

ANTI-TWIST JOINT, ORIENTING SYSTEM AND METHOD

CROSS REFERENCE TO RELATED APPLICATION

This application claims priority to U.S. Provisional Application No. 61/598,857 filed on Feb. 14, 2012.

INCORPORATION BY REFERENCE

All publications and patent applications mentioned in this specification are herein incorporated by reference to the same extent as if each individual publication or patent application was specifically and individually indicated to be incorporated by reference.

FIELD

This application relates generally to positioning systems. More specifically, this application relates to systems, components and methods for orienting a payload while preventing the payload from spinning.

BACKGROUND

Many applications require the ability to continuously point a device, often referred to as a payload, at an object as that object moves relative to the device. Examples of such applications include satellite-mounted equipment, solar arrays, telescopes, turrets, antennas, wind turbines, radar, satellite dishes, robotic end effectors, security cameras, sporting event cameras and webcams. These applications typically require active payload devices, which have electrical, microwave, fluid, or other types of connections. These connections are typically made between the moving payload and a fixed base, around which the payload rotates in one or more axes while tracking. To prevent twisting of these connections, existing solutions either use electrical slip rings or rotary fluid couplings for uninterrupted motion, or must unwind after a certain number of rotations, leading to an inability to continuously track the object of interest. For example, current solutions for radio antennas, such as Stanford University's 150 foot diameter radio telescope known as "The Dish," are only able to rotate twice about their azimuth direction before they have to unwind their cables. Therefore, antennas such as these are unable to continually track an overhead object. Similarly, more terrestrial devices such as camera mounts and gun turrets are unable to continuously track an object without twisting cables or other connections.

The use of "CubeSats" is another example of an application in which it is desirable to continuously track an object without twisting connections. A CubeSat is a type of miniaturized satellite for space research that usually has a volume of exactly one liter (10 cm cube), has a mass of no more than 1.33 kilograms, and typically uses commercial off-the-shelf electronics components. With CubeSats continuing to gain popularity in both educational and commercial satellite markets, the capabilities and requirements of these satellites are growing as well. The fixed solar panels and batteries that could handle the power requirements of earlier CubeSats are inadequate for emerging high-power larger CubeSats. Given the volume and mass constraints of the CubeSat design specification, adding more solar panels is often not an option, thus designs must maximize the efficiency of their panels. The power that a solar panel can generate is proportional to the projected area and orientation along the vector towards the Sun. Therefore, it is vital to orient the panels normal to the Sun for maximum efficiency. This presents a major challenge not only in CubeSats but also in larger satellites. Most satellites in a geosynchronous orbit (GSO) use a simple 1 degree of freedom (DOF) solar tracking system that provides adequate performance. However, in low earth orbit (LEO) applications, 2 or higher DOF systems are needed to efficiently track the sun throughout an entire orbit. It is therefore highly desirable to produce a system that can rotate a solar panel array through an entire hemisphere by varying both a rotation and elevation angle from the satellite, while minimizing system complexity. For a CubeSat application, the system should also take up no more than about half of the volume of the satellite (0.5 U, or 10 cm×10 cm×5 cm) when stowed, as tracking systems larger than this would greatly limit the remaining available payload volume.

What is needed and is not provided by the prior art is a low complexity, low volume, low mass and low cost system that allows for continuous positioning of an object without twisting its connections.

SUMMARY OF THE DISCLOSURE

According to some aspects of the present invention, a positioning system and method are provided for orienting a payload device. In some embodiments, the system may continuously orient the payload device relative to another object without twisting connections of the payload device. In some embodiments, the positioning system has low complexity, low volume and low cost. In some embodiments, the system may also translate the payload device in one or more directions in addition to orienting it.

In some embodiments, a positioning system is provided with a base, a rotating member, a pivoting member, an anti-twist member, and a coupling apparatus. In these embodiments, the rotating member is rotatably mounted to the base such that the rotating member rotates about a first axis. The pivoting member is pivotably mounted to the rotating member such that the pivoting member pivots about a second axis. The anti-twist member is rotatably mounted to the pivoting member. The coupling apparatus rotationally couples the anti-twist member to the base such that the rotational orientation of the anti-twist member relative to the base remains constant regardless of a rotational orientation or a pivoting orientation of the pivoting member relative to the base.

In some embodiments, a satellite is provided with a housing, an orientable payload, and an anti-twist joint coupled between the orientable payload and the housing. The anti-twist joint may comprise a base rigidly coupled to the housing, a rotating member, a pivoting member, an anti-twist member and a coupling apparatus. The rotating member may be rotatably mounted to the base such that the rotating member rotates about a first axis. The pivoting member may be pivotably mounted to the rotating member such that the pivoting member pivots about a second axis. The anti-twist member may be rotatably mounted to the pivoting member and rigidly coupled to the orientable payload. The coupling apparatus may rotationally couple the anti-twist member and the orientable payload to the base such that the rotational orientation of the anti-twist member and the orientable payload relative to the base and the satellite housing remains constant regardless of a rotational orientation or a pivoting orientation of the pivoting member relative to the base.

In some embodiments, a method of positioning a payload relative to a base comprises the steps of providing an apparatus, rotating a payload of the apparatus about a first axis to a desired orientation relative to the base, and pivoting the payload about a second axis to a desired orientation relative to the base. In these embodiments, the apparatus has a base, a rotating member, a pivoting member, an anti-twist member, and a coupling apparatus. The rotating member is rotatably mounted to the base such that the rotating member rotates about the first axis. The pivoting member is pivotably mounted to the rotating member such that the pivoting member pivots about the second axis. The anti-twist member is rotatably mounted to the pivoting member and is rigidly coupled to the orientable payload. The coupling apparatus rotationally couples the anti-twist member and the orientable payload to the base such that the rotational orientation of the anti-twist member and the orientable payload relative to the base remains constant regardless of a rotational orientation or a pivoting orientation of the pivoting member relative to the base.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

The following detailed description should be read with reference to the drawings in which similar elements in different drawings are numbered the same. The drawings, which are not necessarily to scale, depict illustrative embodiments and are not intended to limit the scope of the invention.

Figure 1:
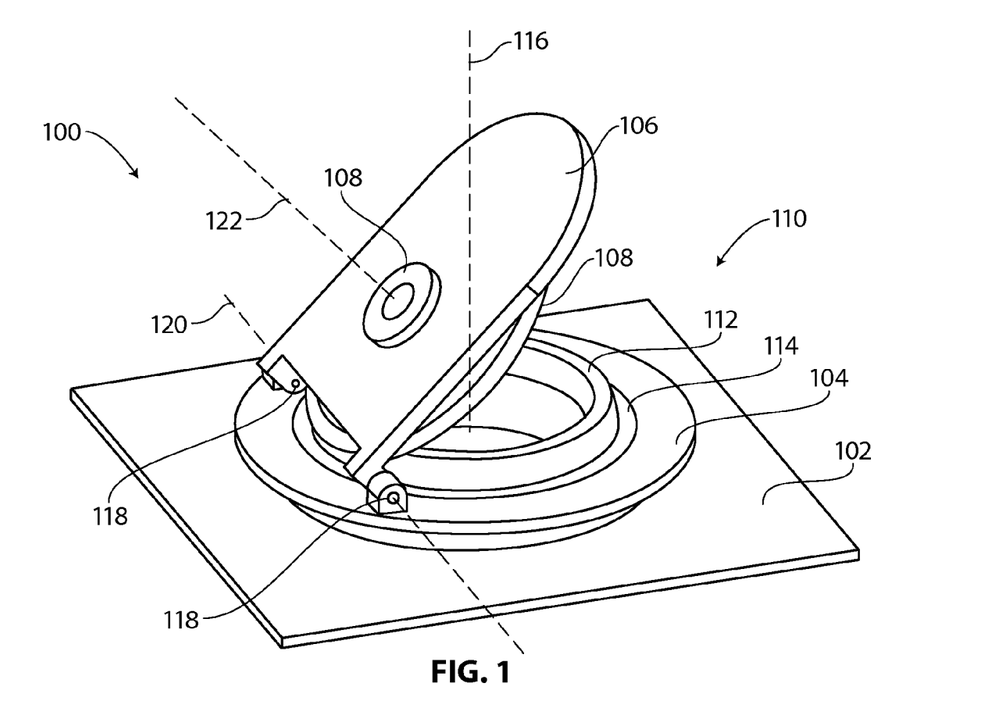
FIG. 1 is a perspective view showing a first embodiment of an anti-twist joint.

Referring to FIG. 1, a simplified model is shown which illustrates basic features of some embodiments of the present invention. In this embodiment, anti-twist joint 100 comprises four main components: a base 102, a rotating member 104, a pivoting member 106, an anti-twist member 108 and a coupling apparatus 110. Base 102 includes a raised center ring 112 rigidly attached to the center of a plate, both of which remain stationary. Rotating member 104 is rotatably mounted to base 102, such as with a bearing 114 located coaxially between rotating member 104 and raised center ring 112 of base 102. With this arrangement, rotating member 104 rotates about a first axis 116, which remains vertical in this exemplary embodiment.

Pivoting member 106 is pivotably mounted to rotating member 104 at pivot points 118, 118 such that pivoting member 106 pivots about a second axis 120. In this exemplary embodiment, the second axis 120 remains horizontal, but rotates with pivoting member 106 and rotating member 104 about the vertical first axis 116. In this embodiment, pivoting member 106 is configured to pivot between 0 degrees (horizontal), through 45 degrees (as shown in FIG. 1), to about 90 degrees (vertical). In other embodiments, the range of pivoting motion may be greater or less than this.

Anti-twist member 108 is rotatably mounted to pivoting member 106 as shown such that it may spin about a third axis 122. Third axis 122 pivots along with pivoting member 106 about second axis 120 with respect to rotating member 104, and also rotates about first axis 116 along with rotating member 104 with respect to base 102. In this embodiment, anti-twist member 108 includes an upper flange located above pivoting member 106 and a lower flange located below pivoting member 106. Anti-twist member 108 may also include a central bore passing therethrough along third axis 122, as shown.

Coupling apparatus 110 is provided between anti-twist member 108 and base 102. In this exemplary embodiment, coupling apparatus 110 includes mating surfaces on the lower flange of anti-twist member 108 and on raised center ring 112. These mating surfaces allow anti-twist member 108 to spin but not slide relative to raised center ring 112 as anti-twist member 108 and pivoting member 106 rotate about the circumference of raised center ring 112 of base 102. These mating surfaces are configured to continually engage each other in this manner regardless of the pivot angle of pivoting member 106 relative to base 102. Additionally, these mating surfaces are configured to have the same circumference or pitch circle regardless of pivot angle, such that there is a 1:1 ratio between the stationary surface of base 102 and the moving surface of anti-twist member 108. In other words, as anti-twist member 108, pivoting member 106 and rotating member 104 make one complete revolution about first axis 116 relative to base 102, anti-twist member 108 makes one complete revolution in the opposite direction about third axis 122 relative to pivoting member 106. This arrangement rotationally couples anti-twist member 108 to the base 102 such that the rotational orientation of anti-twist member 108 relative to base 102 remains constant regardless of the rotational or pivoting orientations of pivoting member 106 relative to base 102. One or both of the mating surfaces on the lower flange of anti-twist member 108 and on raised center ring 112 may comprise an elastomeric material to provide proper frictional engagement between the mating surfaces regardless of the pivot angle of pivoting member 106 relative to base 102.

A payload (not shown) may be attached to anti-twist member 108, such as to the upper flange or central aperture. In this exemplary embodiment, the payload may be rotated by rotating member 104 and pivoted by pivoting member 106 to orient an axis of the payload (such as the third axis 122) in any direction within a hemispheric region. Connections, such as power or signal cables, fiber optic cables, pneumatic, hydraulic, heating, cooling, vacuum or other fluid lines, microwave or other connections can be made between the payload and base 102, such as through the central aperture in anti-twist member 108. Because the anti-twist member 108 and coupling apparatus 110 of anti-twist joint 100 keep the payload from spinning as its axis 122 is oriented in azimuth and elevation, the payload may be continuously reoriented without twisting its connections.

In some embodiments, the previously described mating surfaces of coupling apparatus 110 may include a spherical surface. One or more of the mating surfaces may be formed of or coated with an elastomer, a material having a high coefficient of friction, and/or have a biasing force to keep it in contact with other surface(s). In some embodiments, gear teeth or other inter-engaging features may be provided as part of the mating surfaces for more precise registration between anti-twist member 108 and base 102. The gear teeth may form meshing ball gears, as will subsequently be described in more detail.

Anti-twist joint 100 provides an anti-twist system in a very simple form. It comprises four parts, each with a separate motion (stationary, rotation, rotation+elevation, and rotation+elevation+anti-twist). The reduced part count also means that there are only three interfaces between moving parts. This reduces the bearing count for the anti-twist system, and since bearings add play to the system the anti-twist joint not only has a reduced parts count but also has better inherent accuracy than other possible solutions.

Figure 2:
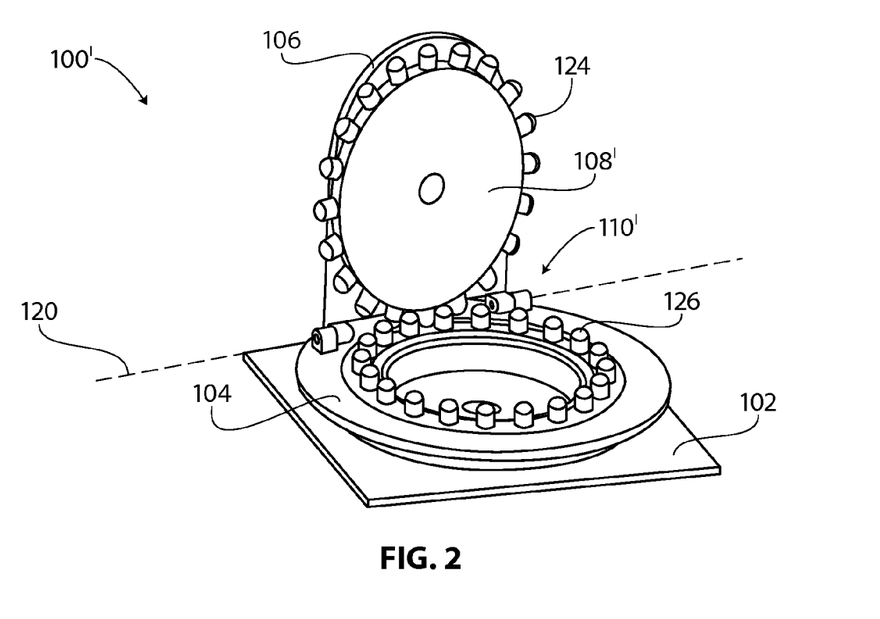
FIG. 2 is a perspective view showing a second embodiment of an anti-twist joint.

Referring to FIG. 2, another exemplary embodiment of an anti-twist joint is illustrated. Similar to the previously described embodiment, anti-twist joint 100' comprises a base plate or body 102, a rotation platform 104, an elevation platform 106, a payload platform 108' and an inner gear interface 110'. The elevation platform 106 is mounted on the rotating platform 104 which has a large gear (not shown in FIG. 2) affixed to it. This gear is driven by a motor (not shown in FIG. 2) mounted just outside the radius of the gear. As the rotating platform 104 rotates, the payload platform 108' precesses via the inner gear interface 110' to prevent wire twist. Payload platform 108' is rotatably mounted to elevation platform 106 and rigidly fixed to a variable angle ball gear 124 that meshes with a fixed inner gear 126 inside rotation platform 104. As elevation platform 106 is rotated around the body 102 of the joint 100', these gears 124 and 126 spin the payload platform 108' in the opposite direction relative to the elevation platform 106. To prevent wire twist, the inner gear 126 and anti-twist gear 124 are designed such that payload platform 108' precesses at a 1:1 ratio with respect to base plate 102. The hinge axis 120 of the elevation plate 106 is oriented to ensure proper gear mesh of the anti-twist gear 124 through the full travel of elevation platform 106.

A major advantage of the anti-twist system of the above embodiments is its simplicity and ability to continuously rotate without twisting wires or other connections. A mechanical coupling, in the form of a variable angle gear, between the base plate and the rotating payload such that as the payload rotates around the vertical z axis prevents relative rotation of the base and the payload, resulting in no net twist. The net effect is that the payload "walks" around the base rather than just rotating around it. This allows the payload to orient in any direction within the hemisphere without rotating relative to the base plate.

Referring to FIGS. 3-10, another exemplary embodiment of an anti-twist joint system 200 is shown. System 200 is specifically designed to be mounted on top of a CubeSat miniaturized satellite. The system has a low volume (10 cm×10 cm×2.5 cm in some embodiments), low mass, low cost, low complexity, and promises to provide a highly precise and reliable platform, all of which are demanded by satellite component design requirements. The anti-twist joint system 200 may be used to deploy and continuously orient the CubeSat's solar panels toward the Sun without twisting wired connections running between the deployed solar panels and the main body of the CubeSat.

Figure 3:
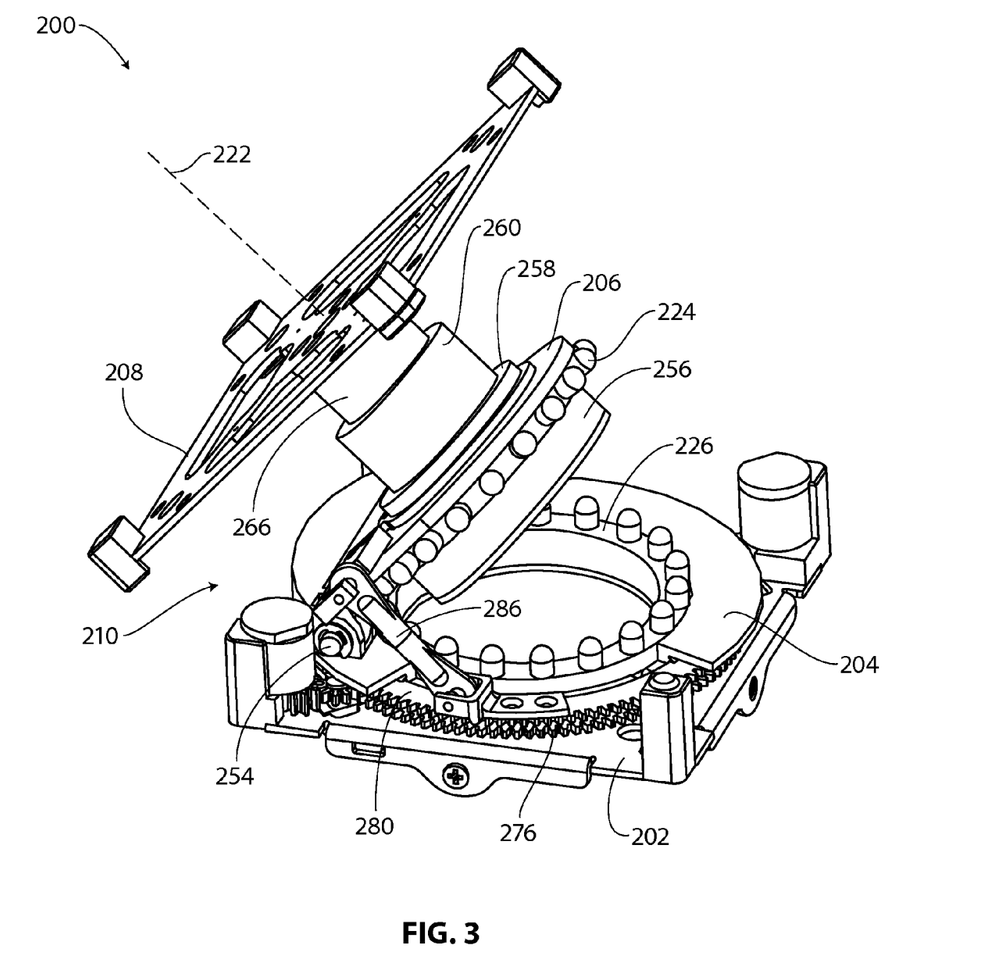
FIG. 3 is a perspective view showing a third embodiment of an anti-twist joint configured for use with a CubeSat.
Figure 4:
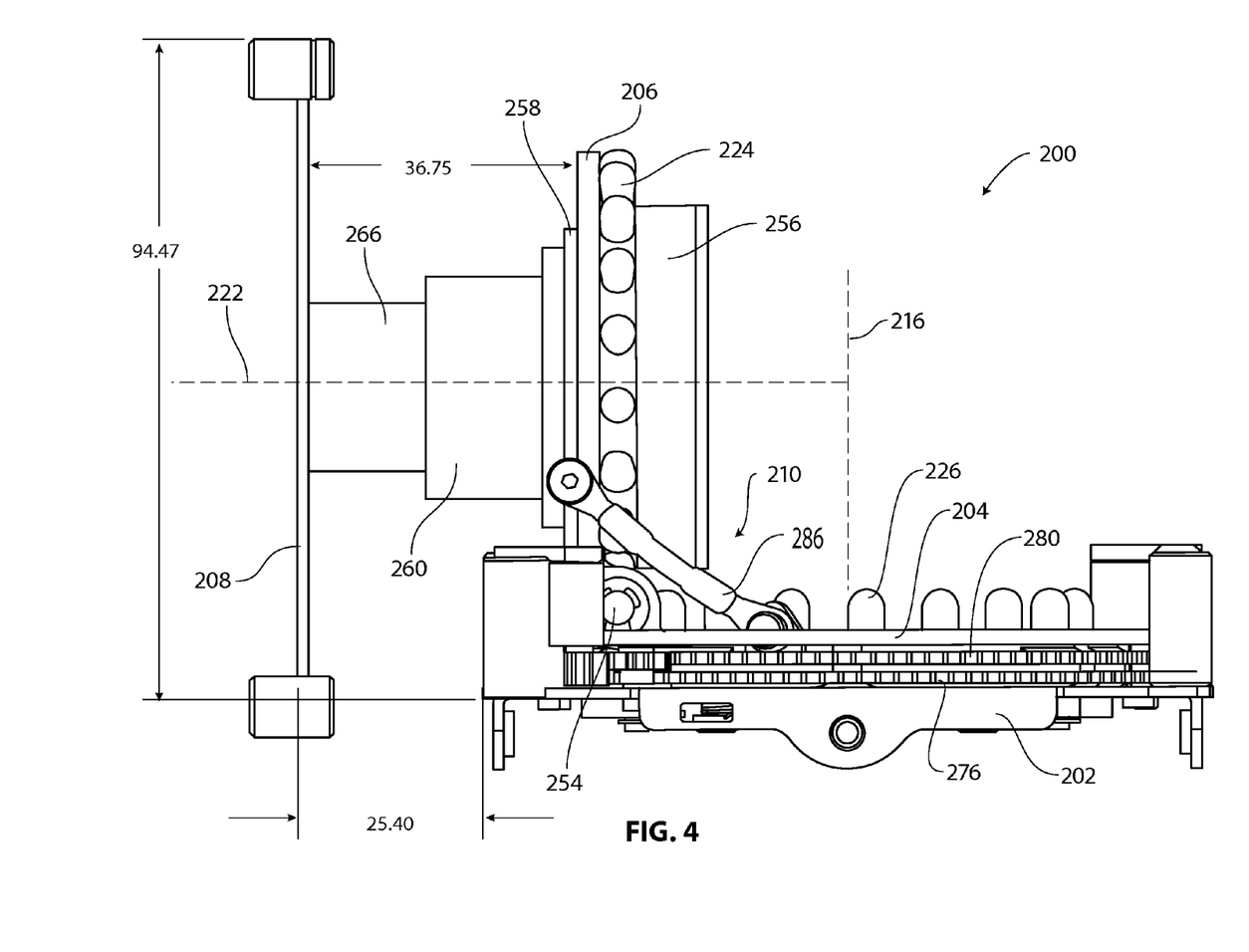
FIG. 4 is a side elevational view showing the anti-twist joint of FIG. 3.
Figure 5:
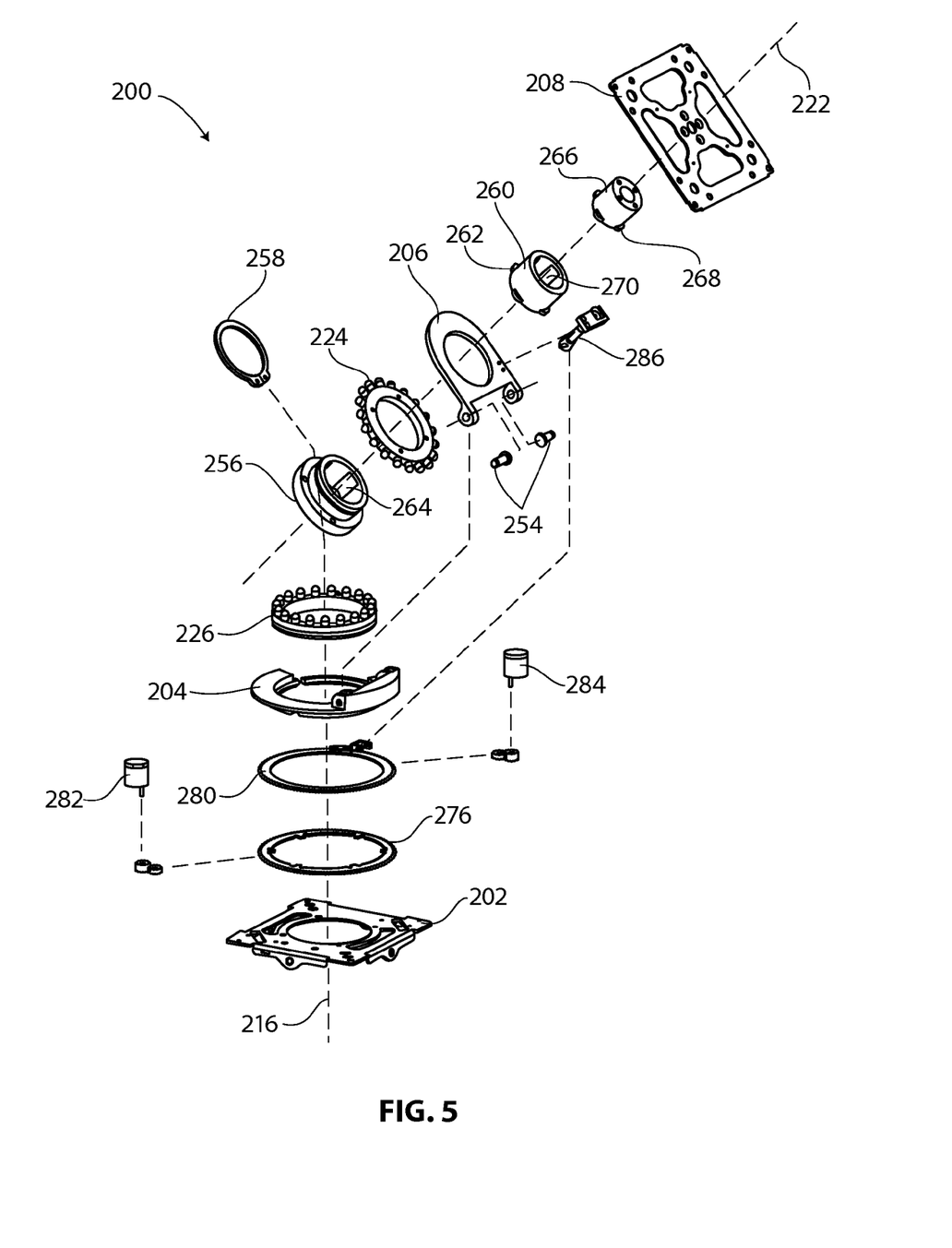
FIG. 5 is an exploded perspective view showing the components of the anti-twist joint of FIG. 3.
Figure 6:
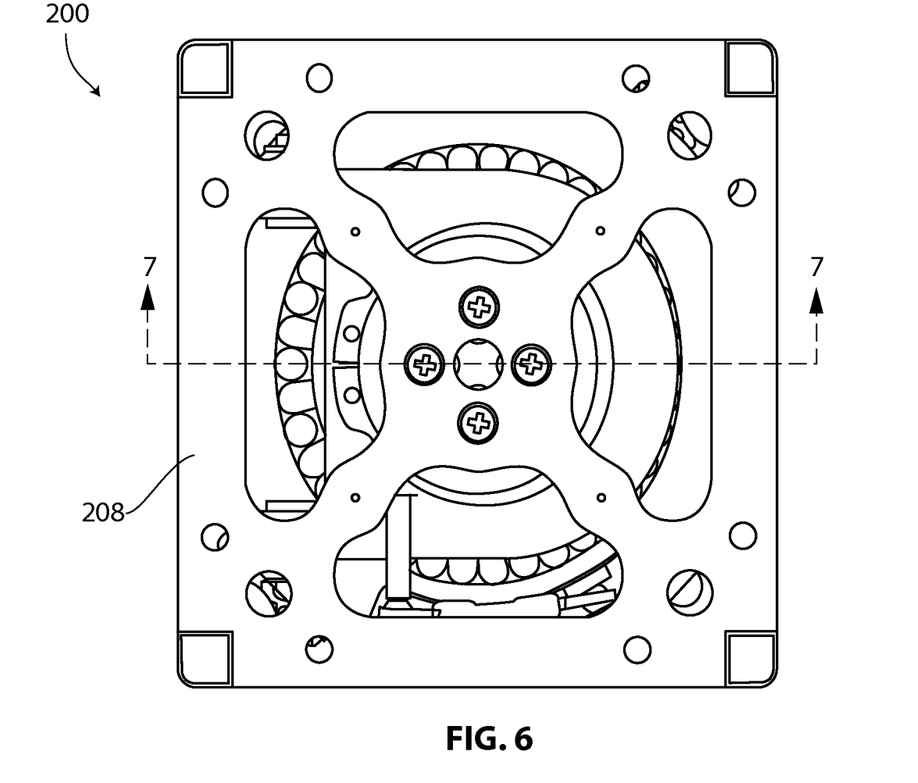
FIG. 6 is a top plan view showing the anti-twist joint of FIG. 3.

As best seen in FIGS. 3-5, system 200 includes a base plate or body 202, a rotation platform 204, an elevation platform 206, a payload platform 208 and an inner gear interface 210. Inner gear interface 210 comprises a variable angle ball gear 224 that meshes with a fixed inner gear 226.

Figure 8:
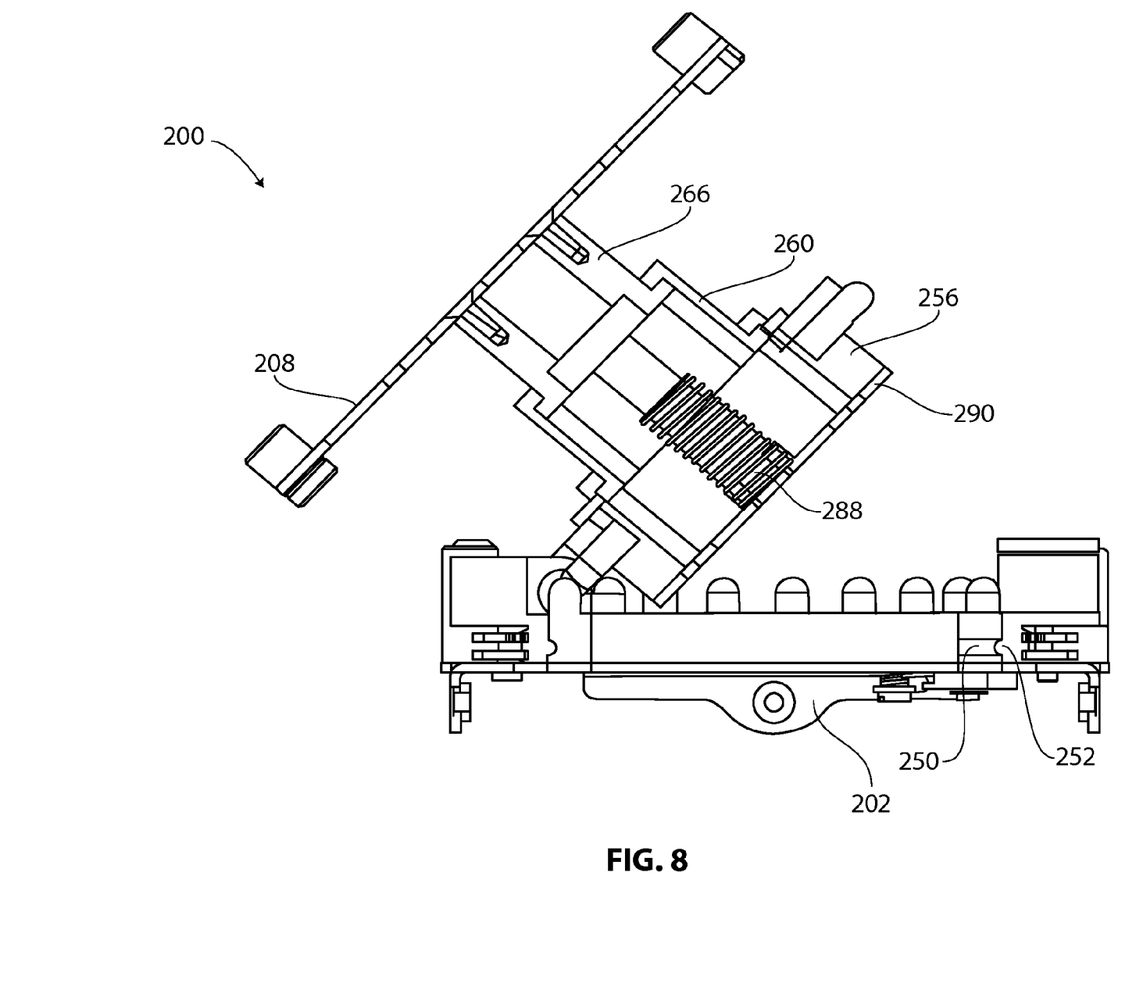
FIG. 8 is broken away side elevational view showing the anti-twist joint of FIG. 3.
Figure 9:
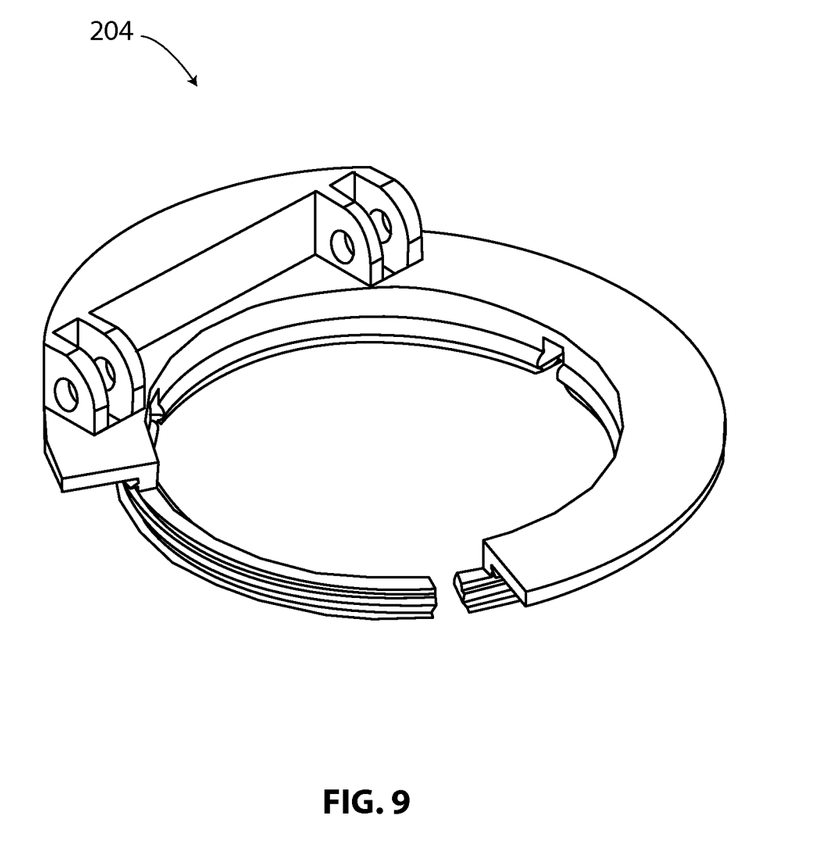
FIG. 9 is a broken away perspective view showing the rotation platform of the anti-twist joint of FIG. 3.

In this exemplary embodiment, fixed inner gear 226 is rigidly attached to the top of base plate 202 with fasteners (not shown). As best seen in FIG. 8, fixed inner gear 226 has a semicircular groove 250 extending around its outer circumference. Rotation platform 204 includes a mating semicircular ridge 252 extending around its inner circumference. This arrangement allows rotation platform 204 to be snapped into place over fixed inner gear 226 and rotatably captivated by mating groove 250 and ridge 252 such that rotation platform 204 may be rotated about a vertical axis 216 relative to base plate 202.

As best seen in FIG. 5, elevation platform 206 may be pivotably attached to rotation platform 204 with pins 254, 254 such that elevation platform 206 pivots relative to rotation platform 204 about a horizontal axis. Variable angle ball gear 224 may be attached to lower tube 256 with fasteners (not shown). Lower tube 256 may in turn be attached to elevation platform 206 with a retainer clip 258. Middle telescoping tube 260 may be slidably retained within lower tube 256 by radially outwardly protruding tabs 262 which slidably engage with longitudinal slots 264 located along the inside circumference of lower tube 256. Upper telescoping tube 266 may in turn be slidably retained within middle telescoping tube 260 by radially outwardly protruding tabs 268 which slidably engage with longitudinal slots 270 located along the inside circumference of middle telescoping tube 260. Payload platform 208 may be rigidly attached to upper telescoping tube 266 with fasteners (not shown). With this arrangement, payload platform 208 may be moved upwardly along third axis 222 from a stowed position to a deployed position, as will be subsequently described in more detail.

Figure 10:
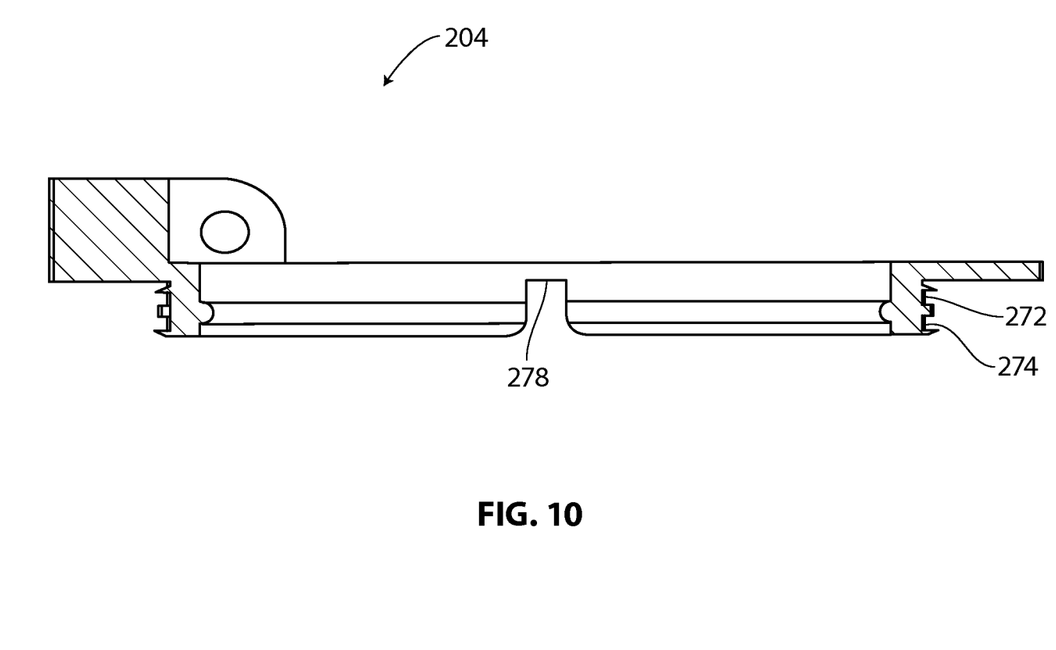
FIG. 10 is a side elevation cross-sectional view showing the rotation platform of the anti-twist joint of FIG. 3.

As best seen in FIG. 10, rotation platform 204 may be provided with an upper gear groove 272 and a lower gear groove 274. A rotation drive gear 276 (best seen in FIG. 5) may be located within the lower gear groove 277 and rotationally locked with place by tabs inwardly protruding from the inner circumference of gear 276 engaging with recesses 278 within rotation platform 204. An elevation drive gear 280 (best seen in FIG. 5) may be slidably located within upper gear groove 272 such that elevation drive gear 280 may rotate with respect to rotation platform 204.

Identical motors 282 and 284 are used to drive the two coaxial gears 276 and 280, respectively, on the outside of rotation platform 204. As previously described, gear 276 is splined to rotation platform 204, and its motion drives the platform's rotation, and the other gear 280 is able to rotate freely relative to rotation platform 204 and to the base 202. When freely rotating gear 280 is moved relative to gear 276 fixed to rotation platform 204, the phase difference between the two gears is changed. The difference in phase is then used to set the angle of the joint's elevation platform 206.

In this exemplary embodiment, the phase difference between the gears 276 and 280 is used to control the elevation angle through a control arm 286. The freely-rotating gear 280 is connected by the control arm 286 to the elevation platform 206. When the two gears 276 and 280 move together and their phase difference is constant, control arm 286 does not move, and it keeps the elevation angle fixed. When the phase difference is increased, the end of the control arm 286 attached to the free gear 280 moves closer to the elevation hinge axis (pins 254). This pushes on the elevation platform 206, forcing it up and increasing the elevation angle.

This approach to actuating the elevation platform has a number of distinct advantages. It allows the use of two identical motors, both of which are completely fixed to the base of the joint. The motors can then be sealed off from the external environment, and the wiring doesn't have to withstand bending or moving and can also be fully sealed within the body of the joint. Fixing the motors to the base of the joint, rather than having one motor rotate with the joint, reduces the mass that must be moved whenever the joint changes its orientation, in turn reducing the torque requirements on the motors themselves. Additionally, the use of identical motors means that for any given joint implementation, only one model of a motor must be qualified for use.

In other embodiments (not shown), another gear (with a smaller radius) may be anchored to the rotating plate but engaged with the teeth of the top coaxial gear 280 at a 90-degree angle. The inside of this gear has an arm mounted to the angle plate. When the coaxial gears rotate together the vertical gear does not spin. When just the top gear rotates the vertical gear turns, increasing the elevation angle. It may also be possible to use the hinge of the elevation plate as a gear and engage the top coaxial gear directly.

Figure 7:
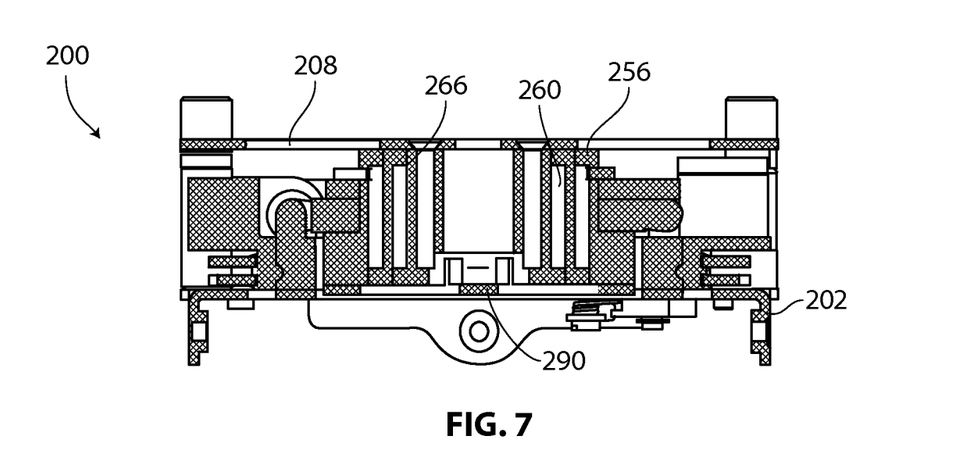
FIG. 7 is a side elevation cross-sectional view taken along line 7-7 in FIG. 6.

Referring to FIGS. 7 and 8, the outward deployment of payload platform 208 provided by telescoping tubes 256, 260 and 266 is further illustrated. FIG. 7 shows payload platform 208 in a compact stowed position for satellite launch, while FIG. 8 shows payload platform 208 in an outwardly deployed position. In the deployed position of FIG. 8, payload platform 208, and any unfurled payload such as solar panel array(s) (not shown), will be able to clear base plate 202 and the rest of the attached satellite (not shown) when the platform and array are rotated in azimuth and pivoted in elevation. As shown in FIG. 8, a compression spring 288 may be provided within the bores of the telescoping tubes. Spring 288 may be mounted on bottom plate 290, which in turn may be mounted to the bottom of lower tube 256. The telescoping tubes may be held in the stowed position of FIG. 7 against the force of spring 288 by an electrically conductive burn wire (not shown). When electrical current is passed through the burn wire, a portion of it melts and releases its tension on the payload platform. Spring 288 is then free to extend the telescoping tubes into their deployed configuration. Means such as a lead screw or motor driven cable may be provided to retract the payload platform, but typically when satellite solar panels are deployed there is no reason to later retract and stow them.

In alternative embodiments (not shown), the payload platform and anti-twist joint can be aligned with any of the other five faces of a CubeSat.

In other embodiments, a universal joint or other longitudinally flexible but rotationally rigid member may be used as a coupling apparatus between the anti-twist member and the base.

Having now described exemplary embodiments, advantages of the anti-twist joint system will be further discussed. Where electrical connections are required between the payload and the base, several designs have been proposed to address continuous hemispherical motion without the use of slip rings. Slip rings wear and are not 100% reliable, which necessitates multiple layers of redundancy that in turn drives up weight, bulk, and cost. Furthermore, slip rings require regular maintenance, cleaning and brush replacement, which requires expensive (or impossible) downtime. Notable existing solutions include the Canfield joint and cable-driven snake-like robot arm (CDSLRA), however each has design aspects that prevent them from being an ideal solution for many applications.

The anti-twist systems disclosed herein have several major advantages over these and other existing joints. In some embodiments of the present disclosure, the anti-twist system utilizes only 2 degrees of freedom (DOF), the minimum number of degrees of freedom required to point a vector in three-dimensional space. Competing 3 DOF joints are inherently more complex and this additional complexity leads to heavier, bulkier systems and more failure points. For example, some 3 DOF systems can experience gimbal lock at certain singularity points. Cable driven alternatives to hinged joints lack rigidity necessary for precise orientation and stability. The present anti-twist systems avoid the risk of gimbal lock without compromising any precision or stability. Furthermore, 3 DOF joints are typically less efficient as they require additional power to control the third DOF.

Another major advantage of the currently disclosed systems is the ability to stow in an extremely small volume. Singularity points in compressed orientations make it difficult for gimbaled joints to stow in a compact position. Cable driven joints must spool almost the entire length of the cables, which takes up volume and has a serious risk of tangling or jamming.

The unique low profile control system used in the present anti-twist systems is also an improvement over existing joints. The coaxial gear system allows the motors to be mounted rigidly to the base in a location that does not interfere with the motion of the payload, while only taking up a fraction of the volume below the base. Most existing 3 DOF systems must either mount 3 motors entirely below the base or make use of custom shaped arms, which can be complex and expensive to manufacture. Using two identical motors in the anti-twist system joint reduce the number of failure points, the parts cost, and also the cost of testing and qualification.

In general, it is desirable to reduce the complexity of any system while preserving its capability. The more complex a system is the more potential points of failure it has. Overly complex mechanical systems take up more space and mass, cost more, and are more error prone. The present anti-twist systems disclosed herein provide a novel way to reduce the complexity of continuous hemispherical motion.

In the stowed configuration of some embodiments of the present system, anti-twist and deployment system takes up approximately 10 cm×10 cm×2.5 cm. The unit is designed with many commercial off-the-shelf (COTS) parts so as to leverage economies of scale for increased reliability and lower cost. The joint addresses the requirements of controlling 2 DOFs in a very small volume by using symmetrically mounted motors driving coaxial gears to vary the elevation and rotation. The wire twist issue is solved by the anti-twist system joint, which uses a gear linkage between the solar array and satellite body to prevent relative rotation. This gear is implemented as a custom-designed ball gear that is engaged at relative angles varying from 0-180 degrees to keep the panels from spinning with respect to the satellite body. In other embodiments, the anti-twist system can be configured with an elevation platform that pivots up to 180 degrees, such that full spherical tracking can be implemented.

Compared to competing designs, such as the Canfield joint, the anti-twist system is less complex, less expensive, and can be more efficiently adapted to systems with volume constraints. The dual coaxial gears allow all the driving components to be rigidly mounted to the base plate in some embodiments, thus making the mounting and wiring of the drive motors very simple. The use of a symmetrical chassis and identical motors for both elevation and rotation control simplifies the manufacturing and testing, thus reducing costs. The innovative anti-twist joint design has the potential to enable many tracking systems that were not previously possible.

What is claimed is:

1. An anti-twist joint comprising:
   a base;
   a rotating member rotatably mounted to the base such that the rotating member rotates about a first axis;
   a pivoting member pivotably mounted to the rotating member such that the pivoting member pivots about a second axis;
   an anti-twist member rotatably mounted to the pivoting member;
   a coupling apparatus having one or more features on the anti-twist member that contact one or more features on the base to rotationally couple the anti-twist member to the base such that the rotational orientation of the anti-twist member relative to the base remains constant regardless of a rotational orientation or a pivoting orientation of the pivoting member relative to the base; and
   a pivot actuator coupled between the pivoting member and the rotating member to control a pivot angle therebetween.

2. The anti-twist joint of claim 1, further comprising a first prime mover located on the base and configured to drive the pivot actuator.

3. An anti-twist joint comprising:
   a base;
   a rotating member rotatably mounted to the base such that the rotating member rotates about a first axis;
   a pivoting member pivotably mounted to the rotating member such that the pivoting member pivots about a second axis;
   an anti-twist member rotatably mounted to the pivoting member;
   a coupling apparatus having one or more features on the anti-twist member that contact one or more features on the base to rotationally couple the anti-twist member to the base such that the rotational orientation of the anti-twist member relative to the base remains constant regardless of a rotational orientation or a pivoting orientation of the pivoting member relative to the base; and
   a second prime mover located on the base and configured to drive the rotating member.

4. An anti-twist joint comprising:
   a base;
   a rotating member rotatably mounted to the base such that the rotating member rotates about a first axis;
   a pivoting member pivotably mounted to the rotating member such that the pivoting member pivots about a second axis;
   an anti-twist member rotatably mounted to the pivoting member; and
   a coupling apparatus having one or more features on the anti-twist member that contact one or more features on the base to rotationally couple the anti-twist member to the base such that the rotational orientation of the anti-twist member relative to the base remains constant regardless of a rotational orientation or a pivoting orientation of the pivoting member relative to the base,
   wherein the anti-twist joint is configured such that as the anti-twist member, the pivoting member and the rotating member make one complete revolution about the first axis relative to the base, the anti-twist member makes one complete revolution in the opposite direction about a third axis relative to the pivoting member.

5. The anti-twist joint of claim 4, wherein the first and the second axes do not intersect.

6. The anti-twist joint of claim 4, wherein the coupling apparatus comprises a ball gear.

7. The anti-twist joint of claim 4, wherein the coupling apparatus comprises an elastomeric material to provide frictional engagement between mating surfaces of the anti-twist member and the base.

8. The anti-twist joint of claim 4, wherein the anti-twist joint is configured to allow the rotating member to continuously rotate about the first axis.

9. The anti-twist joint of claim 4, wherein the anti-twist joint is configured to allow the pivoting member to pivot about the second axis through an angle of 90 degrees.

10. The anti-twist joint of claim 4, wherein the anti-twist joint is configured to allow the pivoting member to pivot about the second axis through an angle of 180 degrees.

11. A satellite comprising:
    a housing having a maximum height, a maximum width and a maximum depth each not exceeding 10 cm;
    an orientable payload comprising a solar panel; and
    an anti-twist joint coupled between the orientable payload and the housing,
    wherein the anti-twist joint further comprises:
        a base rigidly coupled to the housing;
        a rotating member rotatably mounted to the base such that the rotating member rotates about a first axis;
        a pivoting member pivotably mounted to the rotating member such that the pivoting member pivots about a second axis;
        an anti-twist member rotatably mounted to the pivoting member and rigidly coupled to the orientable payload; and
        a coupling apparatus having one or more features on the anti-twist member that contact one or more features on the base to rotationally couple the anti-twist member and the orientable payload to the base such that the rotational orientation of the anti-twist member and the orientable payload relative to the base and the satellite housing remains constant regardless of a rotational orientation or a pivoting orientation of the pivoting member relative to the base,
    wherein the anti-twist joint further comprises a pivot actuator coupled between the pivoting member and the rotating member to control a pivot angle therebetween, a first prime mover located on the base and coupled to the pivot actuator, the first prime mover configured to drive the pivot actuator, and a second prime mover located on the base and coupled to the rotation member, the second prime mover configured to drive the rotating member.

12. The satellite of claim 11, wherein the solar panel, the base, the rotating member, the pivoting member, the anti-twist member, the coupling apparatus, the pivot actuator, the first prime mover, and the second prime mover are configured to fit within a volume not exceeding 10 cm by 10 cm by 5 cm when in a stowed configuration.

13. The satellite of claim 11, wherein the solar panel, the base, the rotating member, the pivoting member, the anti-twist member, the coupling apparatus, the pivot actuator, the first prime mover, and the second prime mover are configured to fit within a volume not exceeding 10 cm by 10 cm by 2.5 cm when in a stowed configuration.

* * * * *